United States Patent
Kopikare et al.

(10) Patent No.: US 7,706,475 B1
(45) Date of Patent: Apr. 27, 2010

(54) COMPENSATION OF I/Q MISMATCH IN A COMMUNICATION SYSTEM USING I/Q MODULATION

(75) Inventors: Rahul Kopikare, Livermore, CA (US); Yungping Hsu, Saratoga, CA (US); Bhaskar Nallapureddy, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 1160 days.

(21) Appl. No.: 11/251,431

(22) Filed: Oct. 14, 2005

Related U.S. Application Data

(60) Provisional application No. 60/672,120, filed on Apr. 15, 2005.

(51) Int. Cl.
*H04L 27/00* (2006.01)
(52) U.S. Cl. .................. 375/324; 375/316; 375/219; 375/295; 375/346; 455/323; 455/296; 455/324
(58) Field of Classification Search .......... 375/324, 375/316, 219, 295, 346; 455/323, 296, 324
See application file for complete search history.

(56) References Cited

U.S. PATENT DOCUMENTS

| | | | |
|---|---|---|---|
| 2003/0095589 A1* | 5/2003 | Jeong | 375/147 |
| 2003/0231723 A1* | 12/2003 | Hansen | 375/343 |
| 2004/0217753 A1* | 11/2004 | Yamanaka et al. | 324/76.21 |

* cited by examiner

*Primary Examiner*—David C Payne
*Assistant Examiner*—Zewdu Kassa

(57) ABSTRACT

A communications system is provided that includes a detector that has I/Q mismatch, a calibration circuit that estimating a phase and/or an amplitude mismatch of the detector, and a compensation circuit that uses the estimated phase and/or amplitude mismatch to mitigate the effects of the amplitude and/or phase mismatch. An IQ-modulated signal produced by the I/Q-modulator can be communicated over a loop back connection to the detector of the communication system. The calibration circuit can estimate the I/Q mismatch for the IQ-modulator and can provide the estimated values to a pre-compensation circuit. In one aspect, I/Q mismatch in the IQ-modulator of a communication system can be determined using a spectrum analyzer. Power measurements can be used to compute the amplitude mismatch and the phase mismatch of an IQ-modulator.

21 Claims, 12 Drawing Sheets

COMPENSATION OF I/Q MISMATCH IN A COMMUNICATION SYSTEM USING I/Q MODULATION

CROSS-REFERENCE TO RELATED APPLICATIONS

This application claims the benefit under 35 U.S.C. §119(e) of U.S. Provisional Application No. 60/672,120, filed Apr. 15, 2005, which is incorporated herein by reference in its entirety.

BACKGROUND OF THE INVENTION

Electronic communications using devices such as telephones, fax machines, mobile telephones, radios, and modems generally involve wireline electric signals and/or wireless electromagnetic signals. The study of electronic signals is called signal processing, and the study of communicating signals is called communication theory.

Electronic signals are generally characterized by at least three well-known properties—frequency, amplitude, and phase—any one of which can be used to represent information. For example, AM radio stations use electromagnetic signals that contain information in their amplitudes, and FM radio stations use electromagnetic signals that contain information in their frequencies. In general, the process of producing a signal that contains information in its frequency, amplitude, and/or phase, is called modulation, and the counterpart process of retrieving information from a such a signal is called demodulation or detection. For a radio station, for example, AM is a shorthand for amplitude modulation and FM is a shorthand for frequency modulation. In the field of communication, devices that perform modulation/demodulation have come to be known as "modems."

AM and FM communication protocols are mainly used in radios that communicate analog audio information, and other communication protocols are generally used to communicate digital information. One popular digital communication protocol is known as "I/Q modulation," in which the communication signal is a combination of two amplitude-modulated sinusoidal signals that have the same frequency but that are $\pi/2$ radians apart in phase, i.e., in "quadrature." Thus, another name for I/Q modulation is quadrature amplitude modulation, or QAM. The "I" in I/Q modulation refers to information associated with the one of the signals (e.g., cosine), and the "Q" refers to information associated with the other signal (e.g., sine).

A fundamental concept that is used with signal processing and communication theory, and especially with I/Q modulation, is the representation of electronic signals as complex functions, i.e., functions that have a real and an imaginary part. Complex functions can be plotted on a complex plane in which the real part of the function corresponds to values on the horizontal axis and the complex part of the function corresponds to values on the vertical axis. The use of complex functions is a conceptual tool that provides a convenient way to represent signal amplitude and phase. For example, suppose a signal is characterized by the complex function $s(t)=r(t)+j \cdot m(t)$, where $r(t)$ and $m(t)$ are real-valued functions and $j$ designates the imaginary part of the complex function. Using the complex function, the magnitude of the signal $s(t)$ can be computed by $|s(t)|=\sqrt{(r(t))^2+(m(t))^2}$, and the phase of the signal can be computed by $$\angle s(t) = \arctan\left(\frac{m(t)}{r(t)}\right).$$

As another example, operations that change the frequency content of a signal can also be described using complex numbers and Fourier transforms. For example, one skilled in the art will recognize that multiplying a signal $s(t)$ with the complex sinusoid $e^{j\omega_c t}=\cos(\omega_c t)+j \cdot \sin(\omega_c t)$ in the time domain will produce a resulting signal $s'(t)=s(t)e^{j\omega_c t}$ in which the frequency content of $s'(t)$ is shifted by $\omega_c$ compared to $s(t)$.

In I/Q modulation, the transmitted signal ideally contains two signals that are in quadrature, such as cosine and sine signals, each having a particular amplitude. For a theoretical explanation, suppose the transmitted signal is $$s(t)=s_{I,k}\delta(t-kT)\cos(\omega_c t)+s_{Q,k}\delta(t-kT)\sin(\omega_c t),$$

where $\omega_c$ is the angular frequency, $$T = \frac{2\pi}{\omega_c},$$

k is an integer, $\delta(t-kT)$ is the time-shifted ideal impulse function, and $s_{I,k}$ and $s_{Q,k}$ are real values. Further suppose that the values of $s_{I,k}$ and $s_{Q,k}$ are chosen to satisfy the equations $s_{I,k}=A_k\cos(\theta_k)$ and $s_{Q,k}=A_k\sin(\theta_k)$. Then, the transmitted signal becomes $$s(t)=A_k\cos(\theta_k)\delta(t-kT)\cos(\omega_c t)+A_k\sin(\theta_k)\delta(t-kT)\sin(\omega_c t).$$

Recognizing that $\cos(a-b)=\cos(a)\cos(b)+\sin(a)\sin(b)$, the transmitted signal can be expressed as $$s(t)=\delta(k-kT)A_k\cos(\omega_c t-\theta_k),$$

which shows that particular choices of values for $s_{I,k}$ and $s_{Q,k}$ can result in different amplitude and phase for the transmission signal. Accordingly, I/Q modulation can represent information by modulating the amplitude and phase of the transmission signal. It is suitable to note here that the impulse function is purely theoretical and, in reality, can be replaced by some pulse-shaped function $p(t)$.

In the field of digital communication, the set of all available values $s_{I,k}$ and $s_{Q,k}$ is called a "constellation," and each available pair of values $(s_{I,k}, s_{Q,k})$ is called a signal point. When the constellation is designed such that $A_k$ does not change for different signal points and only $\theta_k$ changes, the modulation is called phase-shift keying, or PSK. When the constellation is designed such that $\theta_k$ does not change for different signal points and only $A_k$ changes, the modulation is called amplitude-shift keying, or ASK. In general, however, both $A_k$ and $\theta_k$ may change. Also, the number M of signal points in a constellation determines the amount of information that is associated with each signal point. In general, each signal point can represent $b=\lfloor \log_2 M \rfloor$ bits of information, and usually M is a power of two.

Ultimately, the desired operation of a transmitter is to perform frequency, amplitude, and/or phase modulation, and circuits exist that can do so directly. For example, a voltage-controlled oscillator can be used to perform frequency modulation. If frequency modulation is not needed, however, it may be simpler to use I/Q modulation. For example, I/Q modulation can require generating two quadrature signals, varying the amplitudes of the signals according to a constellation, and then combining the amplitude-modulated signals to, effectively, produce an amplitude and/or phase modulated transmission signal. Additionally, I/Q modulation may also simplify the detection/demodulation of the transmission signal. Detection of an I/Q modulated signal will be described later herein.

One complication that can arise in I/Q modulation is that the quadrature oscillators of a transmitter and/or receiver may not be ideal and may actually not be in quadrature, giving rise to phase mismatch. Another complication is that the quadrature oscillators may provide periodic signals that have different amplitudes, giving rise to amplitude mismatch. These complications will be referred to herein as "I/Q mismatch." I/Q mismatch can introduce unwanted frequency components into a signal and can degrade the performance of a communication system. While the "I" and "Q" oscillators in a transmitter may be carefully designed and manufactured, I/Q mismatch can nevertheless occur because of temperature dependencies and/or other phenomena affecting oscillators. Therefore, there is continued interest in providing communication systems that can operate effectively when I/Q mismatch occurs.

SUMMARY OF THE INVENTION

The disclosed technology provides a system and method for estimating I/Q mismatch in the transmitter and receiver circuitry of a communication system and for mitigating the effects of I/Q mismatch on transmitted and received signals.

The communications system includes a detector for receiving and demodulating an IQ-modulated signal, a calibration circuit for estimating the phase and/or amplitude mismatch of the detector, and a compensation circuit for using the estimated phase and/or amplitude mismatch to mitigate the effects of the amplitude and/or phase mismatch.

Calibration of estimated values for I/Q mismatch in a detector operates based on white, Gaussian noise samples. The calibration operation operates based on a cross-correlation between a sequence of compensated "I" noise samples and a sequence of compensated "Q" noise samples and/or based on a power level difference between the sequence of compensated "I" noise samples and the sequence of compensated "Q" noise samples. The calibration circuit operates so as to allow the cross-correlation and the power level difference to converge towards zero. The calibration circuit produces estimated I/Q mismatch values using an iterative technique. The calibration circuit can include a gear shifting circuit to adjust one or more parameters in the iterative technique. The estimated I/Q mismatch values produced by the calibration circuit are used by a compensation circuit to mitigate the effects of I/Q compensation on a received signal.

Calibration of estimated values for I/Q mismatch in an IQ-modulator operates based on signals that have zero cross-correlation, zero mean, and the same power level. An IQ-modulated signal produced by the IQ-modulator can be communicated over a loop back connection to the receiver of the same communication system. The I/Q mismatch effects of the receiver can be mitigated by the receiver compensation circuit, but the compensated signal will still be affected by I/Q mismatch from the transmitter. In the loopback mode, the calibration circuit can estimate the I/Q mismatch from the transmitter and can provide the estimated values for the I/Q mismatch to the pre-compensation circuit of the transmitter.

In accordance with one aspect of the invention, I/Q mismatch in the IQ-modulator of a communication system can be determined by using a spectrum analyzer. Multiple IQ-modulated signals that have various levels of amplitude mismatch pre-compensation or phase mismatch pre-compensation can be provided. A spectrum analyzer can be used to measure the signal power of the IQ-modulated signals, and the power measurements can be used to compute the amplitude mismatch and the phase mismatch of an IQ-modulator.

In accordance with one aspect of the invention, a communications means includes a detection means for receiving and demodulating an IQ-modulated signal, calibration means for estimating the phase and/or amplitude mismatch of the detection means, and compensation means for using the estimated phase and/or amplitude mismatch to mitigate the effects of the amplitude and/or phase mismatch.

In one embodiment, calibration of estimated values for I/Q mismatch in a detection means operates based on white, Gaussian noise samples. The calibration means operates based on a cross-correlation between a sequence of compensated "I" noise samples and a sequence of compensated "Q" noise samples and based on a power level difference between the sequence of compensated "I" noise samples and the sequence of compensated "Q" noise samples. The calibration means operates so as to allow the cross-correlation and the power level difference to converge towards zero. The calibration means produces estimated I/Q mismatch values using an iterative technique. The calibration means can include a gear shifting means for adjusting one or more parameters of the iterative technique. The estimated I/Q mismatch values produced by the calibration means can be used by the compensation means to mitigate the effects of I/Q compensation on a received signal.

Calibration of estimated values for I/Q mismatch in an IQ-modulator means operates based on signals that have zero cross-correlation, zero mean, and the same power level. An IQ-modulated signal produced by the IQ-modulator means can be communicated over a loop back means to the detection means of the communication means. The I/Q mismatch effects of the detection means can be mitigated by the compensation means, but the compensated signal will still be affected by I/Q mismatch from the transmitter. The calibration means can estimate the I/Q mismatch from the transmitter and can provide the estimated values for the I/Q mismatch to a pre-compensation means.

In accordance with one aspect of the invention, I/Q mismatch in an IQ-modulator means of a communication means can be determined by using a spectrum analyzer means. Multiple IQ-modulated signals that have various levels of amplitude mismatch pre-compensation or phase mismatch pre-compensation can be provided. A spectrum analyzer means can be used to measure the signal power of the IQ-modulated signals, and the power measurements can be used by a mismatch computation means to compute the amplitude mismatch and the phase mismatch of an IQ-modulator.

In one aspect of the invention, a computer program running on a processor is provided for estimating I/Q mismatch in a detector. The computer program can operate based on white, Gaussian noise samples. The calibration computer program operates based on a cross-correlation between a sequence of compensated "I" noise samples and a sequence of compensated "Q" noise samples and based on a power level difference between the sequence of compensated "I" noise samples and the sequence of compensated "Q" noise samples. The calibration computer program operates to allow the cross-correlation and the power level difference to converge towards zero. The calibration computer program can produce estimated I/Q mismatch values using an iterative technique. The calibration computer program can include a gear shifting technique that can adjust one or more parameters in the iterative technique. The estimated I/Q mismatch values produced by the calibration computer programs are used by a compensation computer program to mitigate the effects of I/Q compensation on a received signal.

A calibration program running on a computer for estimating values of I/Q mismatch in an IQ-modulator can operate based on signals that have zero cross-correlation, zero mean, and the same power level. An IQ-modulated signal produced by the IQ-modulator can be communicated over a loop back connection to the detector of the communication system. The I/Q mismatch effects of the detector can be mitigated by the compensation computer program, but the compensated signal will still be affected by I/Q mismatch from the transmitter. The calibration computer program can estimate the I/Q mismatch from the transmitter and can provide the estimated values for the I/Q mismatch to the pre-compensation computer program.

Further features of the invention, its nature and various advantages, will be more apparent from the accompanying drawings and the following detailed description of the various embodiments.

DETAILED DESCRIPTION

The disclosed technology provides a communication system and method for handling I/Q mismatch, which can occur in the transmitter and/or the receiver of a communication system. An ideal "I" oscillator and an ideal "Q" oscillator provide periodic signals that are $\pi/2$ radians apart in phase. For ease of explanation and without limiting the scope of the invention, it will be assumed herein that an ideal "I" oscillator provides a cosine signal and an ideal "Q" signal provides a sine signal. Accordingly, I/Q mismatch can be described by an amplitude mismatch of $\alpha$ and/or a phase mismatch of $\beta$ between the "I" and "Q" oscillators that can be described mathematically by $$I_{osc}(t) = \left(1 + \frac{\alpha}{2}\right)\cos\left(\omega_c t + \frac{\beta}{2}\right), \text{ and} \quad (EQ1)$$

$$Q_{osc}(t) = \left(1 - \frac{\alpha}{2}\right)\sin\left(\omega_c t - \frac{\beta}{2}\right), \quad (EQ2)$$

where $\omega_c$ is the oscillator frequency.

Figure 1:
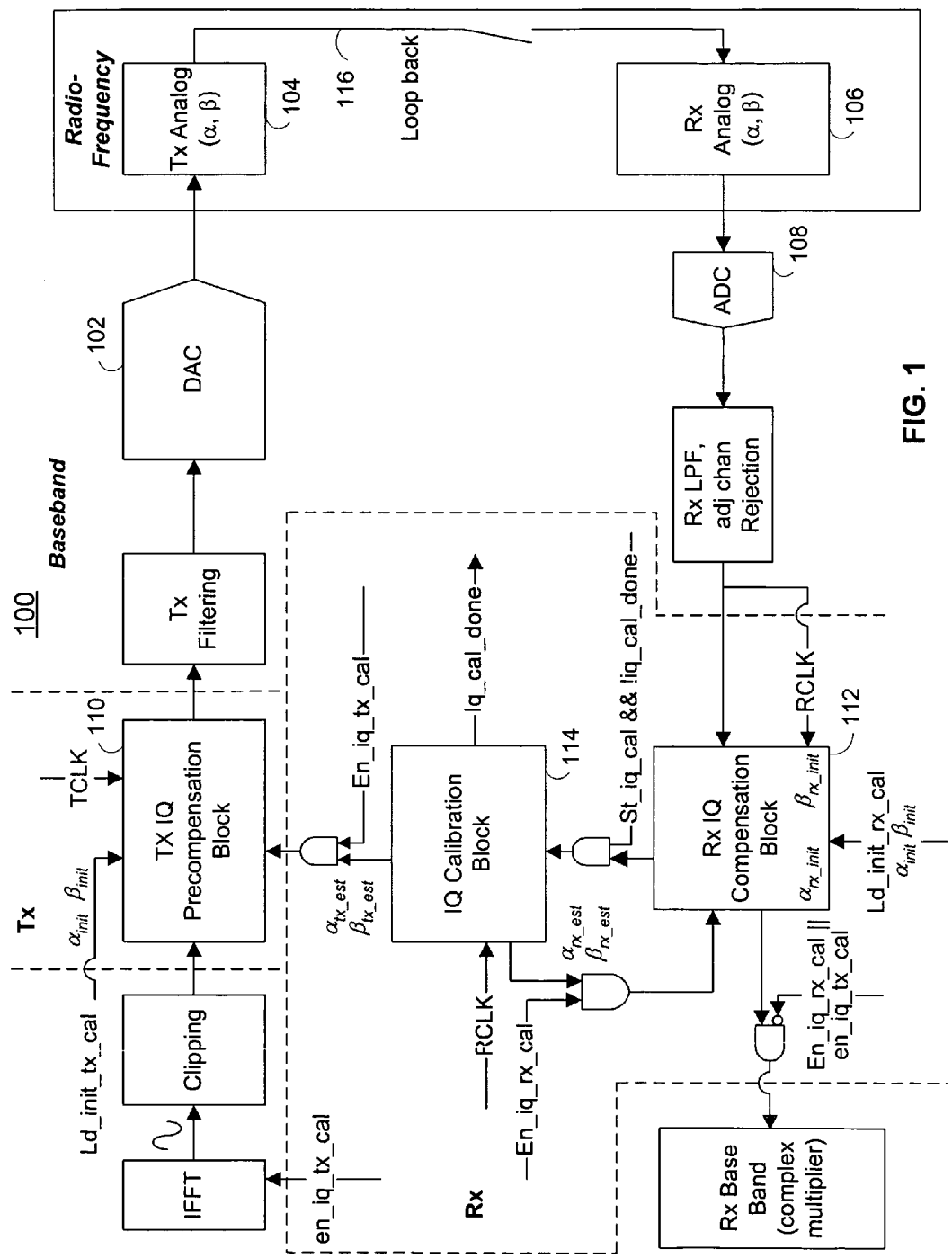
FIG. 1 is a block diagram of an exemplary communication system that uses I/Q modulation.

Referring now to FIG. 1, there is shown a communication system 100 that includes transmitter circuitry and receiver circuitry. The communication system 100 can exist in a communication device such as a cellular telephone or a modem, for example. The transmitter circuitry can communicate information to another communication device, and the receiver circuitry can receive information communicated from another communication device.

The illustrated transmitter circuitry includes a digital-to-analog converter (DAC) 102 that is capable of producing an analog signal representation of digital information. The analog signal can have a particular range of baseband frequencies, where the range can be defined or required by industry or regulatory standards or otherwise. For example, the analog signal may be an amplitude-modulated pulse signal $s_{I,k}p(t-kT)$ or $s_{Q,k}p(t-kT)$, or the analog signal may be a signal value $s_{I,k}$ or $s_{Q,k}$. The transmitter circuitry includes an I/Q modulator 104 that includes "I" and "Q" oscillators (not shown), which may have I/Q mismatch. In the illustrated embodiment, the oscillators provide a frequency $$f_c = \frac{\omega_c}{2\pi}$$

that is in the radio frequency (RF) range. However, the oscillator frequency need not be in the RF range can be another frequency. The output of the I/Q modulator is a signal $$s(t) = s_{I,k}p(t-kT)I_{osc}(t) + s_{Q,k}p(t-kT)Q_{osc}(t). \quad (EQ3)$$

In some communication systems, the pulse function $p(t-kT)$ may not be needed and the transmission signal may simply be $$s(t) = s_{I,k}I_{osc}(t) + s_{Q,k}Q_{osc}(t). \quad (EQ4)$$

The receiver circuitry includes components that complement the transmitter circuitry and includes a detector/demodulator 106 and an analog-to-digital converter (ADC) 108. The detector 106 includes "I" and "Q" oscillators (not shown) that are used in demodulating a transmission signal to recover a transmitted signal point $(s_{I,k}, s_{Q,k})$. This demodulation will be described later herein in connection with FIG. 2. The detector oscillators may also have I/Q mismatch. Therefore, the output of the detector 106 may be affected by I/Q mismatch from a modulator and/or I/Q mismatch from a detector.

In accordance with one aspect of the disclosed invention, a communication system can include components that mitigate the effects of I/Q mismatch. The transmitter circuitry in the communication system 100 can include a pre-compensation block 110 that pre-conditions digital signals in the transmitter circuitry to mitigate the anticipated effects of any I/Q mismatch in the modulator 104. The receiver circuitry can include a compensation block 112 that alters demodulated signals to mitigate the effects of any I/Q mismatch from a detector 106. The operations of the pre-compensation and compensation blocks 110, 112 will be described later herein in connection with FIG. 3.

The compensation block 112 and the pre-compensation block 110 operate based on estimated values of α and β for I/Q mismatch, which will be denoted as $\alpha_{tx\_est}$ and $\beta_{tx\_est}$ for transmitter I/Q mismatch, and $\alpha_{rx\_est}$ and $\beta_{rx\_est}$ for receiver I/Q mismatch. The estimated values can be generated by a calibration block 114 that can provide initial values for the estimated I/Q mismatch and that can adjust the values of the estimates. This process will be described later herein in connection with FIG. 4.

Figure 2:
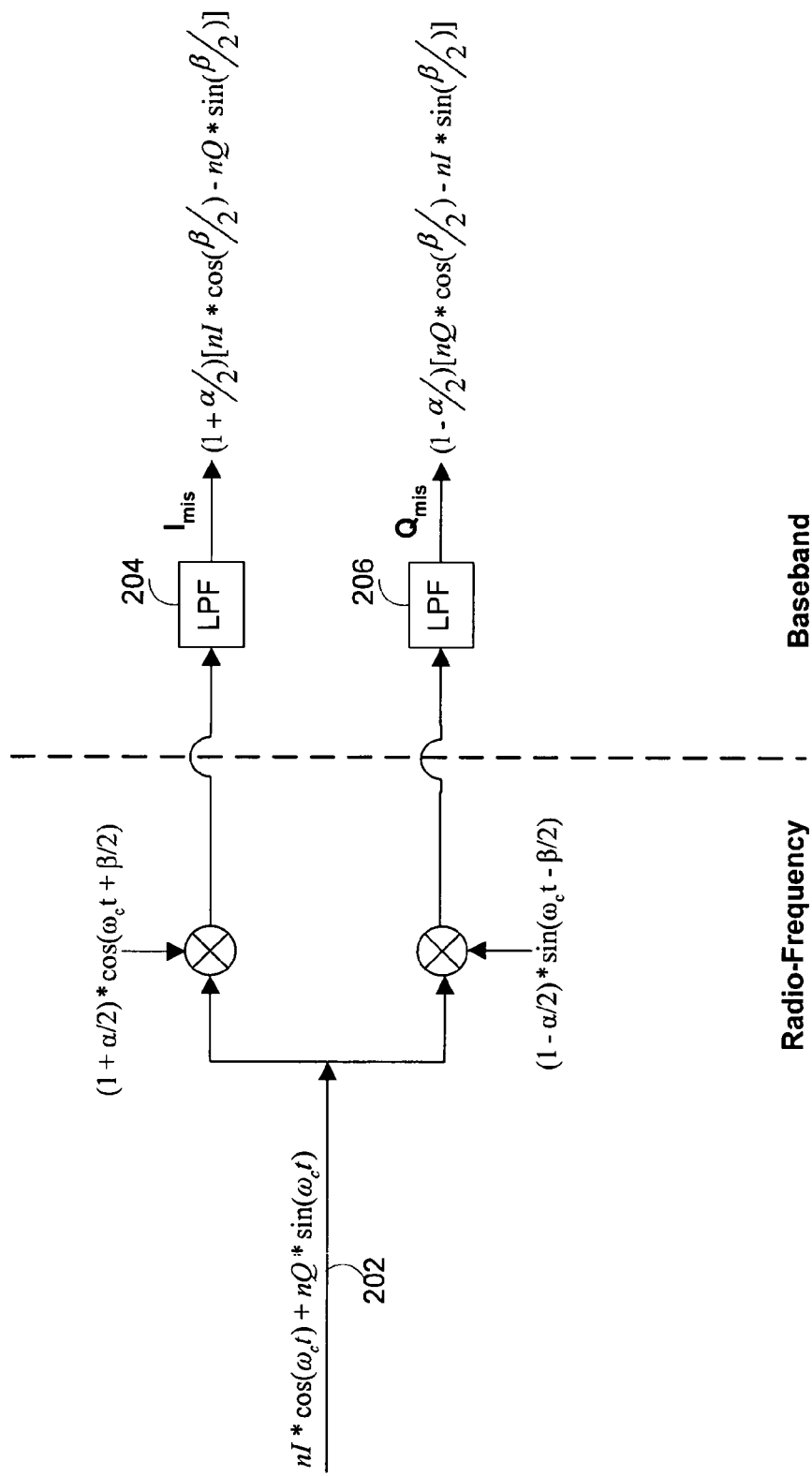
FIG. 2 is a diagram of the operation of a detector that receives an I/Q modulated signal.
Figure 3:
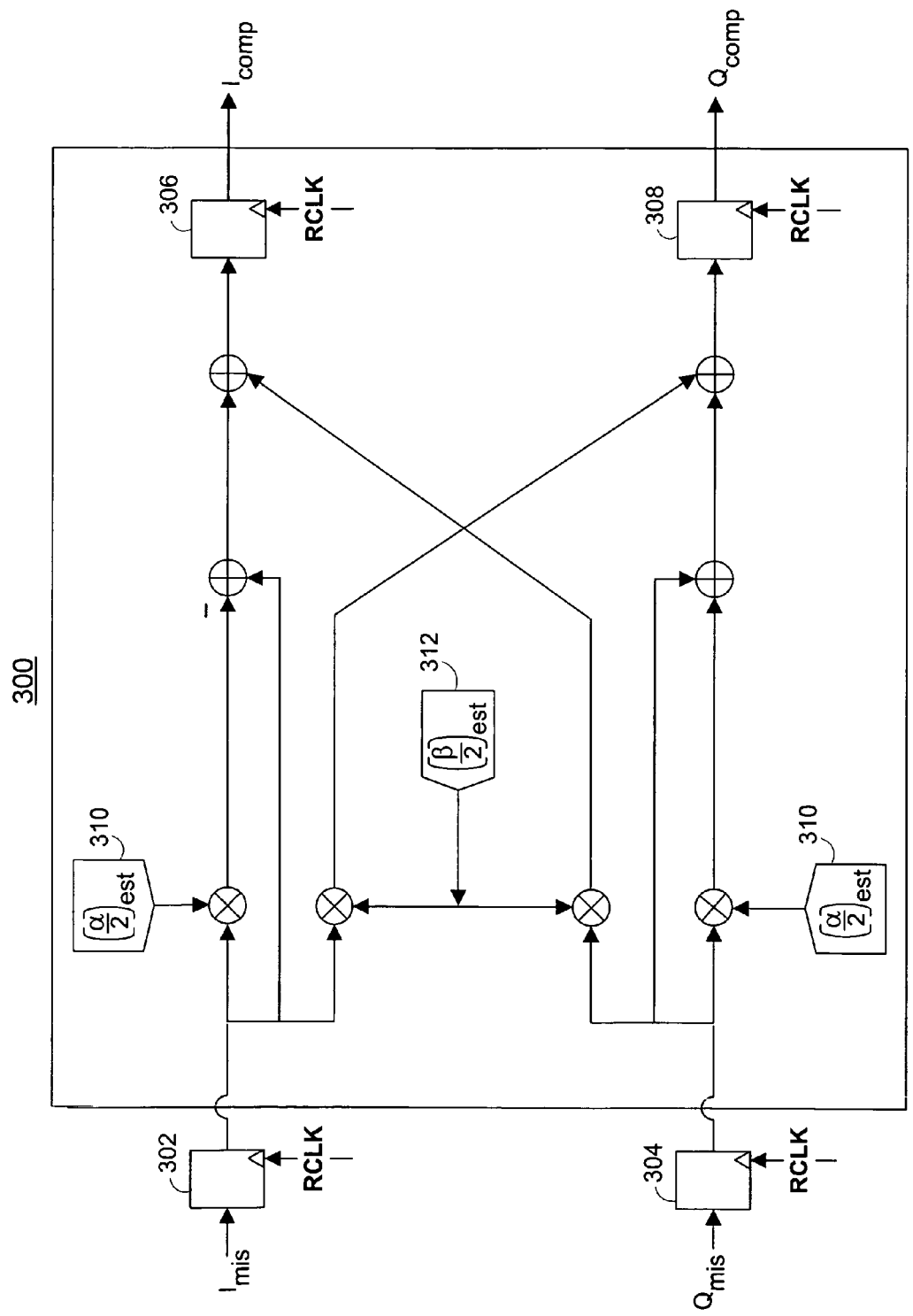
FIG. 3 is a diagram of an exemplary receiver mismatch compensation circuit.
Figure 4:
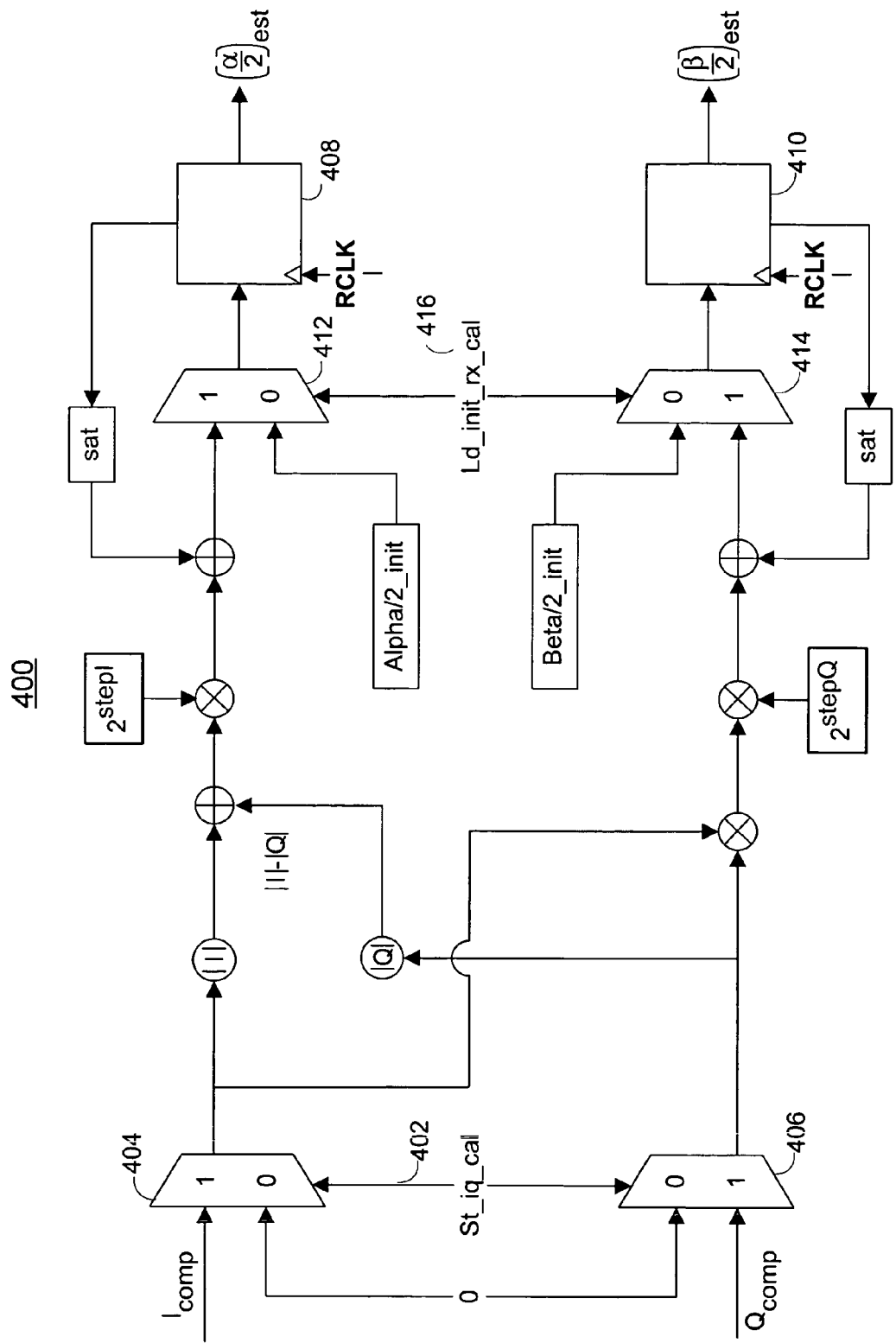
FIG. 4 is a diagram of an exemplary calibration circuit for calibrating a mismatch compensation circuit.

The following paragraphs, in conjunction with FIGS. 2-4, will now describe an aspect of the disclosed invention for mitigating the effects of detector I/Q mismatch.

FIG. 2 shows a diagram of the operation of an exemplary detector/demodulator. For simplicity, the detector/demodulator will hereafter be interchangeably referred to as either detector or demodulator. The purpose of the detector is to recover transmitted signal points $(s_{I,k}, s_{Q,k})$ from an IQ-modulated signal. Ideally, the input 202 to the detector is a transmitted signal $s_{I,k} \cdot \cos(\omega_c t) + s_{Q,k} \cdot \sin(\omega_c t)$. In the detector, the input signal 202 is multiplied by the "I" oscillator signal and passed through a low pass filter 204 to produce the "I" component, which is denoted as $I_{mis}$. Similarly, the input signal 202 is also multiplied by the "Q" oscillator signal and passed through a low pass filter 206 to produce the "Q" component, which is denoted as $Q_{mis}$.

If the detector has no I/Q mismatch, $I_{mis}$ would be based only on the value of $s_{I,k}$ and $Q_{mis}$ would be based only on the value of $s_{Q,k}$. This can be seen by recognizing that a signal $\cos(\omega_c t) \cdot \sin(\omega_c t)$ has frequency content only at $\omega = \pm 2\omega_c$ and passing such a signal through a low pass filter that excludes $\omega = \pm 2\omega_c$ would result in no signal. However, the signals $\cos(\omega_c t) \cdot \cos(\omega_c t)$ and $\sin(\omega_c t) \cdot \sin(\omega_c t)$ each have frequency content at $\omega = 0$ and at $\omega = \pm 2\omega_c$. Therefore, the result of low pass filtering such signals would produce the frequency component at $\omega = 0$, which is a DC signal. For example, if the detector had no I/Q mismatch and the "I" oscillator produced an ideal cosine signal $\cos(\omega_c t)$, multiplying this cosine signal with an input signal would produce $s_{I,k} \cdot \cos(\omega_c t) \cdot \cos(\omega_c t) + s_{Q,k} \cdot \cos(\omega_c t) \cdot \sin(\omega_c t)$ at the input to the "I" low pass filter. Based on linearity of Fourier transforms, we can examine each term of the summation individually. Low pass filtering the term $s_{Q,k} \cdot \cos(\omega_c t) \cdot \sin(\omega_c t)$ would result in no signal, and low pass filtering the term $s_{I,k} \cdot \cos(\omega_c t) \cdot \cos(\omega_c t)$ would result in a DC signal that is based only on the value $s_{I,k}$, which would be $I_{mis}$. Using the same type of analysis, it can be seen that if the "Q" oscillator produced an ideal sine signal, $Q_{mis}$ would be based only on the value of $s_{Q,k}$.

The situation is different when there is I/Q mismatch in the "I" and "Q" oscillators. This can be seen by recognizing that $$\cos\left(\omega_c t + \frac{\beta}{2}\right) = \cos(\omega_c t)\cos\left(\frac{\beta}{2}\right) - \sin(\omega_c t)\sin\left(\frac{\beta}{2}\right), \text{ and}$$

$$\sin\left(\omega_c t - \frac{\beta}{2}\right) = \sin(\omega_c t)\cos\left(\frac{\beta}{2}\right) - \cos(\omega_c t)\sin\left(\frac{\beta}{2}\right).$$

I/Q mismatch causes the "I" and "Q" oscillators to each produce signals that have both sine and cosine components, thereby resulting in values of $I_{mis}$ and $Q_{mis}$ that depend on both $s_{I,k}$ and $s_{Q,k}$.

In accordance with one aspect of the disclosed invention, it is important that detector I/Q mismatch be handled separately from transmitter I/Q mismatch. This can be accomplished in one embodiment by providing a detector calibration input signal at the input to the detector. The calibration input signal can be based on white Gaussian noise samples.

With continuing reference to FIG. 2, when the detector I/Q mismatch is being estimated, the input signal 202 to the detector can be a calibration input signal $$nI_k \cdot \cos(\omega_c t) + nQ_k \cdot \sin(\omega_c t). \tag{EQ5}$$

The values $nI_k$ and $nQ_k$ are white, Gaussian noise samples that can be generated by thermal noise inherent in the receiver circuitry. Because the noise samples are statistically white (i.e., orthogonal to each other over a large ensemble of points) and are statistically of equal magnitude, it is suitable to show $nI_k$ and $nQ_k$ as modulating cosine and sine signals, respectively. When the noise samples are multiplied with the detector oscillators, the multiplication injects amplitude and phase imbalance that cause the noise samples to no longer be statistically white or have statistically equal magnitude. Based on this operation, it can be seen the output of the low pass filters 204, 206 are the DC signals $$I_{mis} = \left(1 + \frac{\alpha}{2}\right)\left[nI_k \cdot \cos\left(\frac{\beta}{2}\right) - nQ_k \cdot \sin\left(\frac{\beta}{2}\right)\right], \text{ and} \tag{EQ6}$$

$$Q_{mis} = \left(1 - \frac{\alpha}{2}\right)\left[nQ_k \cdot \cos\left(\frac{\beta}{2}\right) - nI_k \cdot \sin\left(\frac{\beta}{2}\right)\right], \tag{EQ7}$$

Referring again to FIG. 1, the output of the detector 106 is sampled by an ADC 108, and the samples are communicated to a compensation block 112. In accordance with one aspect of the disclosed invention, the compensation block 112 produces compensated values $I_{comp}$ and $Q_{comp}$ based on the values $I_{mis}$ and $Q_{mis}$ and estimated values $$\left(\frac{\alpha}{2}\right)_{est}$$

and $$\left(\frac{\beta}{2}\right)_{est},$$

which are received from a calibration block 114.

FIG. 3 shows a diagram of one exemplary embodiment of a compensation block. The illustrated compensation block 300 includes registers 302-308 that are timed by a clock signal RCLK, which indicates the times at which the values $I_{mis}$ and $Q_{mis}$ are ready at the input of the compensation block 300. The compensation block produces the compensated signals $I_{comp}$ and $Q_{comp}$ as follows:

$$I_{comp} = I_{mis}\left[1 - \left(\frac{\alpha}{2}\right)_{est}\right] + Q_{mis} \cdot \left(\frac{\beta}{2}\right)_{est}, \text{ and} \tag{EQ8}$$

$$Q_{comp} = I_{mis} \cdot \left(\frac{\beta}{2}\right)_{est} + Q_{mis}\left[1 - \left(\frac{\alpha}{2}\right)_{est}\right], \tag{EQ9}$$

where the values of $$\left(\frac{\alpha}{2}\right)_{est}$$

310 and $$\left(\frac{\beta}{2}\right)_{est},$$

312 are received from the calibration block (114, FIG. 1). The ideal value of $$\left(\frac{\alpha}{2}\right)_{est}$$

is $$\left(\frac{\alpha}{2}\right),$$

and the ideal value of $$\left(\frac{\beta}{2}\right)_{est}$$

is $$\left(\frac{\beta}{2}\right).$$

To illustrate the mismatch mitigating effect of the compensation block 300 when the values of $$\left(\frac{\alpha}{2}\right)_{est}$$

and $$\left(\frac{\beta}{2}\right)_{est}$$

are ideal, we can use equations EQ6 and EQ7 in equation EQ8 to expand $I_{comp}$ to become $$I_{comp} = \left(1 - \frac{\alpha^2}{4}\right)\left[nI_k \cdot \cos\left(\frac{\beta}{2}\right) - nQ_k \cdot \sin\left(\frac{\beta}{2}\right)\right] + \left(\frac{\beta}{2} - \frac{\alpha \cdot \beta}{4}\right)\left[nQ_k \cdot \cos\left(\frac{\beta}{2}\right) - nI_k \cdot \sin\left(\frac{\beta}{2}\right)\right].$$

Assuming that $$\frac{\alpha^2}{4} \approx 0 \text{ and } \frac{\alpha \cdot \beta}{4} \approx 0,$$

$I_{comp}$ becomes $$I_{comp} \approx nI_k\left[\cos\left(\frac{\beta}{2}\right) - \left(\frac{\beta}{2}\right)\sin\left(\frac{\beta}{2}\right)\right] + nQ_k\left[\left(\frac{\beta}{2}\right)\cos\left(\frac{\beta}{2}\right) - \sin\left(\frac{\beta}{2}\right)\right].$$

Next, if the phase mismatch is small, then $$\cos\left(\frac{\beta}{2}\right) \approx 1, \quad \sin\left(\frac{\beta}{2}\right) \approx \frac{\beta}{2},$$

and $$\frac{\beta^2}{4} \approx 0.$$

Then, it can be seen that $I_{comp}$ becomes $$I_{comp} \approx nI_k\left[1 - \frac{\beta^2}{4}\right] + nQ_k\left[\left(\frac{\beta}{2}\right) \cdot 1 - \frac{\beta}{2}\right] \approx nI_k.$$

In the same way, it can be shown that when the values of $$\left(\frac{\alpha}{2}\right)_{est}$$

and $$\left(\frac{\beta}{2}\right)_{est}$$

are ideal, $Q_{comp} \approx nQ_k$. Therefore, when the values of $$\left(\frac{\alpha}{2}\right)_{est}$$

and $$\left(\frac{\beta}{2}\right)_{est}$$

are ideal, the sequences of values $I_{comp}$ and $Q_{comp}$ are approximately equal to the white, Gaussian noise samples $nI_k$ and $nQ_k$, respectively.

Referring now to FIG. 4, there is shown a diagram of one exemplary embodiment of a calibration block in accordance with one aspect of the invention. The calibration block 400 provides estimated I/Q mismatch values $$\left(\frac{\alpha}{2}\right)_{est}$$

and $$\left(\frac{\beta}{2}\right)_{est}$$

to the compensation block 300 of FIG. 3. The calibration block 400 performs the calibration operation when the start calibration signal St_iq_cal is high, for example. The start calibration signal is used to control multiplexers 404,406 that provide input values for the calibration operation. When $St_{13}$ iq_cal=0, the input multiplexers 404,406 provide an input value of zero to the calibration operation, which effectively means that no calibration operation is being performed. The calibration block 400 includes registers 408,410 that store the values of $$\left(\frac{\alpha}{2}\right)_{est}$$

and $$\left(\frac{\beta}{2}\right)_{est}.$$

As before, the registers 408,410 are timed by the clock signal RCLK. The inputs to the registers are coupled to multiplexers 412,414 that are controlled by a "load initial values" signal Ld_init_rx_cal. When Ld_init_rx_cal=0, initial values for $$\left(\frac{\alpha}{2}\right)_{est}$$

and $$\left(\frac{\beta}{2}\right)_{est}$$

are loaded into the registers. When Ld_init_rx_cal=1, the registers 408,410 store adjusted values of $$\left(\frac{\alpha}{2}\right)_{est}$$

and $$\left(\frac{\beta}{2}\right)_{est}.$$

The calibration block 400 operates based on the premise that, without I/Q mismatch, the sequences of white Gaussian noise samples $I_{comp}=I_{mis}=nI_k$ and $Q_{comp}=Q_{mis}=nQ_k$ should, statistically, have zero cross-correlation, zero mean, and the same power level. When there is I/Q mismatch, the cross-correlation will be different than zero and power in the sequences $I_{comp}=I_{mis}=nI_k$ and $Q_{comp}=Q_{mis}=nQ_k$ will be different. The calibration circuit operates on one noise sample at a time rather than operating on a sequence of noise samples. Specifically, the calibration block 400 iteratively adjusts the estimated values $$\left(\frac{\alpha}{2}\right)_{est}$$

and $$\left(\frac{\beta}{2}\right)_{est}$$

based on the compensated values $I_{comp}$ and $Q_{comp}$ from the compensation block, using the equations:

$$\left(\frac{\alpha}{2}\right)_{est}[n] = \left(\frac{\alpha}{2}\right)_{est}[n-1] + (|I_{comp}| - |Q_{comp}|) \cdot 2^{StepI}, \text{ and} \quad (EQ10)$$

$$\left(\frac{\beta}{2}\right)_{est}[n] = \left(\frac{\beta}{2}\right)_{est}[n-1] + (I_{comp} \cdot Q_{comp}) \cdot 2^{StepQ}, \quad (EQ11)$$

where $2^{StepI}$ and $2^{StepQ}$ are positive real numbers less than one. Equation EQ10 adjusts the estimated value $$\left(\frac{\alpha}{2}\right)_{est}$$

based on the difference in power level between the sequences of noise samples $I_{comp}$ and $Q_{comp}$. The amount of each adjustment is $(|I_{comp}|-|Q_{comp}|) \cdot 2^{StepI}$, which can be a positive adjustment or a negative adjustment. Equation EQ11 adjusts the estimated value $$\left(\frac{\beta}{2}\right)_{est}$$

based on the cross-correlation between the sequences of values $I_{comp}$ and $Q_{comp}$. The amount of each adjustment is $(I_{comp} \cdot Q_{comp}) \cdot 2^{StepQ}$, which can also be a positive or a negative adjustment. Larger adjustments can be made by using larger values of $2^{StepI}$ and $2^{StepQ}$, and smaller adjustments can be made by using smaller values of $2^{StepI}$ and $2^{StepQ}$.

Although equations EQ10 and EQ11 make adjustments based on individual noise samples, the important consideration is the net amount of adjustments over a particular number of most recent adjustments. If the sequences of values $I_{comp}$ and $Q_{comp}$ are statistically white and statistically have the same power level over a particular number of most recent values, then the net amount of adjustments in each of equations EQ10 and EQ11 should be zero. This happens when $I_{comp} \approx nI_k$ and $Q_{comp} \approx nQ_k$, i.e., when $$\left(\frac{\alpha}{2}\right)_{est} = \frac{\alpha}{2} \text{ and } \left(\frac{\beta}{2}\right)_{est} = \frac{\beta}{2}.$$

However, when the sequences of values $I_{comp}$ and $Q_{comp}$ are not statistically white or do not statistically have the same power level, then the net amount of adjustments will force $$\left(\frac{\alpha}{2}\right)_{est}$$

towards $$\frac{\alpha}{2}$$

and will force $$\left(\frac{\beta}{2}\right)_{est}$$

towards $$\frac{\beta}{2}.$$

Figure 5:
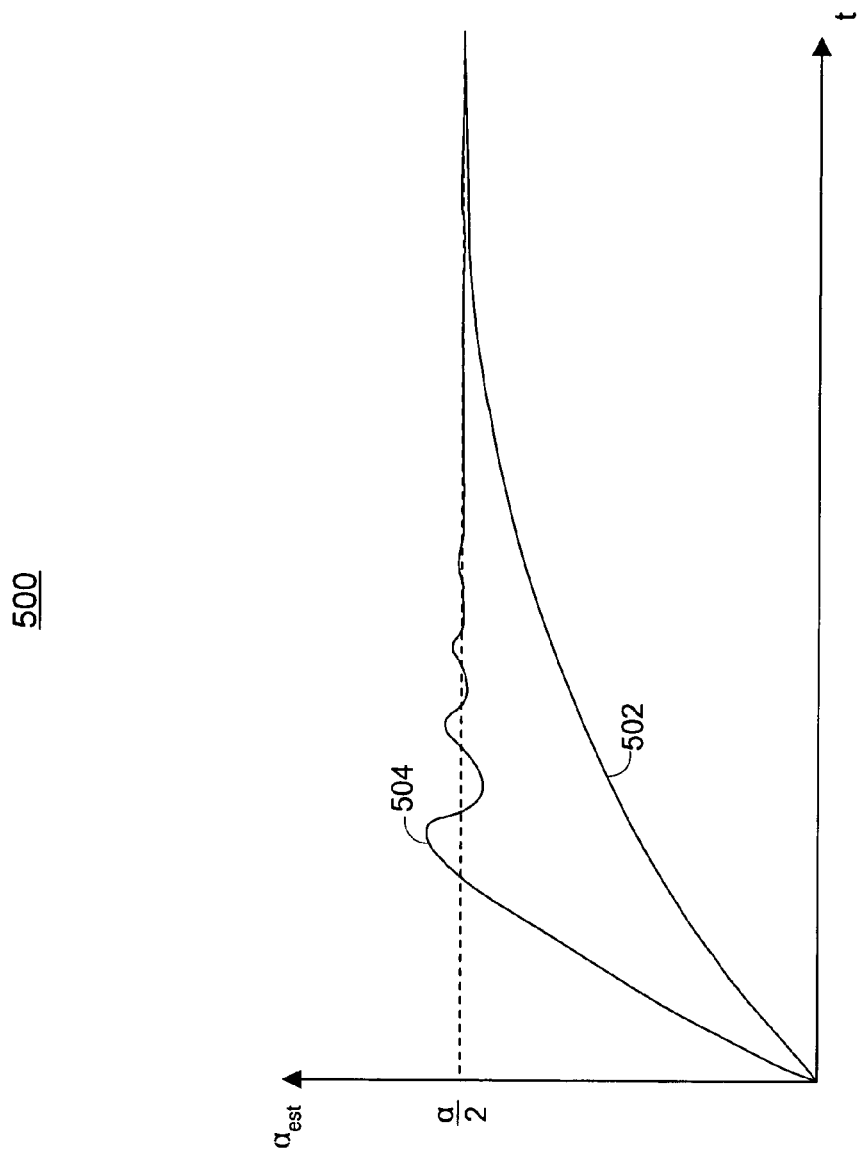
FIG. 5 is a diagram of an exemplary transmitter mismatch compensation circuit.

FIG. 5 shows an exemplary graph of the operation of the calibration circuit forcing $$\left(\frac{\alpha}{2}\right)_{est}$$

towards $$\frac{\alpha}{2}.$$

A first curve 502 illustrates the operation when the value of $2^{StepI}$ is constant and relatively small. Starting with the an initial value $$\left(\frac{\alpha}{2}\right)_{est}[0] = 0,$$

the value of $$\left(\frac{\alpha}{2}\right)_{est}$$

is gradually adjusted towards $$\frac{\alpha}{2}.$$

Because $2^{StepI}$ is smaller, the adjustments are also smaller, and it takes the first curve 502 a longer time to reach $$\frac{\alpha}{2}.$$

A second curve 504 in the graph illustrates the operation of the calibration circuit where the value of StepI is changed by a "gear shifting" technique. As used herein, gear shifting refers to a technique that adjusts the value of $2^{StepI}$ and that recognizes when and how much to adjust the value. In the illustration, the calibration circuit can start by using a greater value of $2^{StepI}$ than that of the first curve 502. Because $2^{StepI}$ is larger, the adjustments are also larger, and it takes the second curve 502 a shorter time to reach $$\frac{\alpha}{2}.$$

However, the larger adjustments also cause the second curve 504 to over-shoot $$\frac{\alpha}{2}.$$

In one embodiment, the gear shifting technique can recognize that it has passed $$\frac{\alpha}{2}$$

by looking for inflection points in the curve 504. Each time the gear shifting technique recognizes that it has reached an inflection point, the calibration circuit can decrease the value of $2^{StepI}$ to make the adjustments smaller. In this manner, the second curve 504 can converge to $$\frac{\alpha}{2}$$

more quickly than the first curve 502. A gear shifting technique can also be used to adjust the value of $2^{StepQ}$. The corresponding curve for $\left(\frac{\beta}{2}\right)_{est}$ when using a gear shifting technique will be similar to the second curve 504 shown in FIG. 5. The curves 502, 504 shown in FIG. 5 are exemplary and do not limit the scope of the invention.

Accordingly, what has been described thus far is a system and a method for estimating I/Q mismatch values in the receiver circuitry of a communication system and for mitigating the effects of I/Q mismatch on a received signal using estimated I/Q mismatch values. Calibration of the estimated I/Q mismatch in a detector operates based on sequences of Gaussian noise samples $nI_k$ and $nQ_k$ that are statistically white, that have zero mean, and that statistically have the same power level. Because of I/Q mismatch in the receiver, the detected "I" and "Q" sequences of noise samples become correlated and diverge in power levels. The calibration block and the compensation block work together in a way that allows the compensation block to remove the I/Q mismatch from the detected noise samples, thereby producing sequences of detected noise samples that are again statistically white and that again have the same power levels. Accordingly, the calibration block and the compensation block together implement a parameter minimizing operation that minimizes cross-correlation and power level difference between the sequences of compensated values $I_{comp}$ and $Q_{comp}$.

Referring again to FIG. 1, the calibration block 114 can also be used to estimate I/Q mismatch values in the transmitter circuitry and, specifically, in the I/Q modulator 104. In accordance with one aspect of the disclose invention, the communication system 100 can include a loop back connection 116 that allows a transmission signal from the transmitter circuitry to be locally received by the receiver circuitry. The I/Q mismatch values for the detector 106 can be estimated as described above herein by using sequences of white, Gaussian noise samples $nI_k$ and $nQ_k$ that statistically have the same power level. When the detector I/Q mismatch values are being estimated, the loop back path 116 is open so that the effect of the modulator I/Q mismatch is excluded.

When the calibration of detector I/Q mismatch values is complete, the calibration block 114 can be used to estimate the modulator's I/Q mismatch values. To do so, the transmitter pre-compensation block 110 can receive sequences of "I" and "Q" digital baseband values that have zero cross-correlation, zero mean, and the same statistical power level. For example, the "I" and "Q" digital baseband values can correspond to cosine and sine signals that have the same frequency. The baseband values can be preconditioned by the pre-compensation block 110 and converted into an analog baseband signal by the DAC 102. The analog baseband signal can then be converted into a RF signal by the I/Q modulator 104, which introduces I/Q mismatch into the "I" and "Q" sequences. The IQ-modulated signal can be communicated through the loopback connection 116 and can be received by the detector 106. Because the detector's I/Q mismatch values have been estimated, the effects of the detector's I/Q mismatch can be mitigated by the compensation block 112. Thus, the compensated values $I_{comp}$ and $Q_{comp}$ at the output of the compensation block 112 will, effectively, be affected only by the modulator's I/Q mismatch. The output of the compensation block 112 can be communicated to the calibration block 114 to be used in estimating the transmitter's I/Q mismatch values. The calibration block 114 and the pre-compensation block 110 work together in the same way as the receiver mismatch calibration. The calibration block 114 provides estimated transmitter mismatch values to the pre-compensation block 110, which uses the estimated values to perform pre-compensation. If the estimated transmitter mismatch values are equal to the actual transmitter mismatch values, the input to the calibration block 114 will be sequences of "I" and "Q" values that have zero cross-correlation and the same statistical power level. In this case, there would be substantially zero net amount of adjustments to $$\left(\frac{\alpha}{2}\right)_{tx\_est}$$

and $$\left(\frac{\beta}{2}\right)_{tx\_est}.$$

Otherwise, the net amount of adjusts would be non-zero and would cause $$\left(\frac{\alpha}{2}\right)_{tx\_est} \text{ and } \left(\frac{\beta}{2}\right)_{tx\_est}$$

to adjust towards $$\left(\frac{\alpha_{tx}}{2}\right) \text{ and } \left(\frac{\beta_{tx}}{2}\right),$$

respectively.

Figure 6:
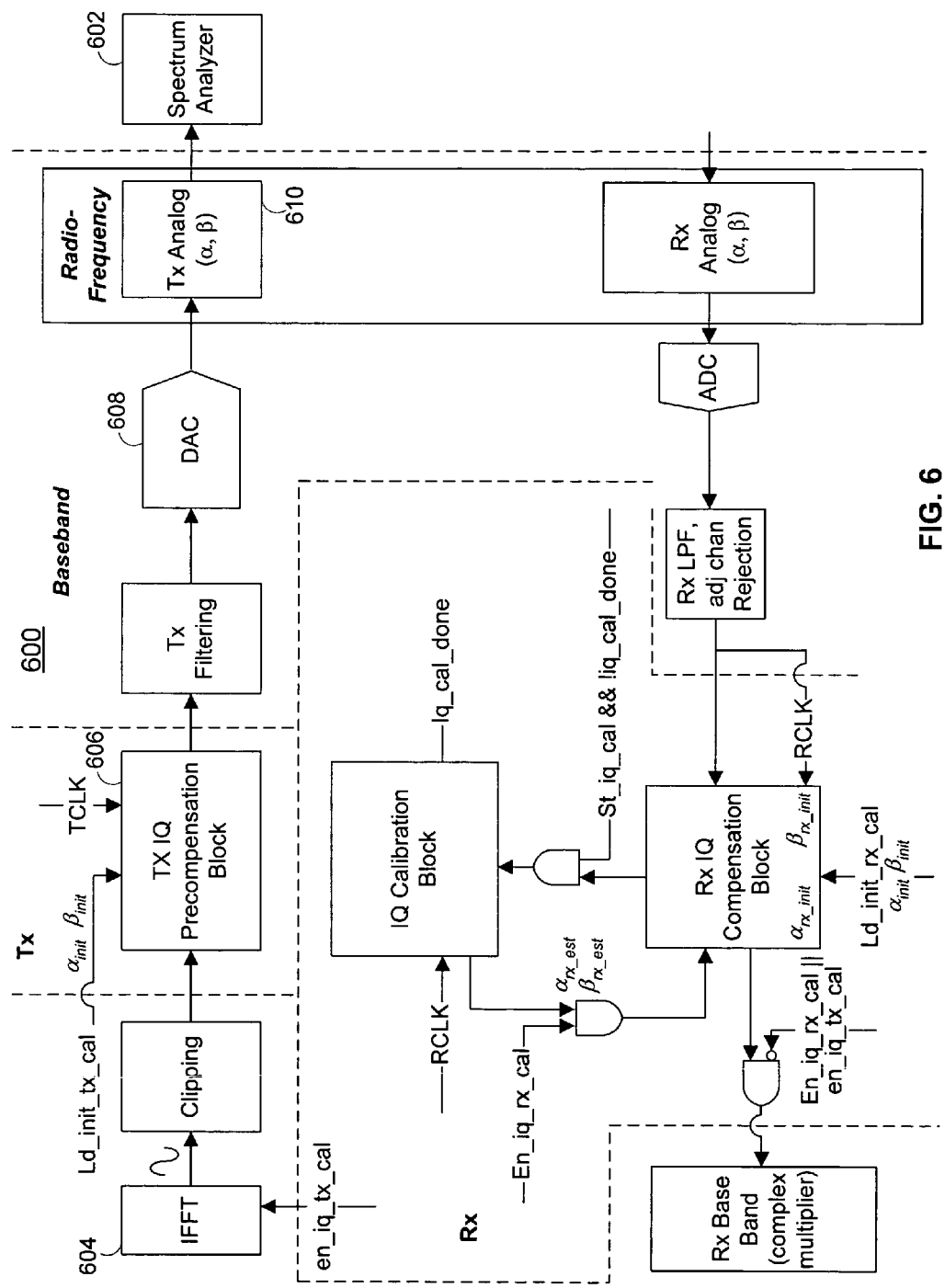
FIG. 6 is a block diagram of an exemplary communication system that calibrates a transmitter mismatch compensation circuit using a spectrum analyzer.

In accordance with another aspect of the invention, I/Q mismatch values in the modulator of a transmitter circuitry can be estimated using a spectrum analyzer that measures signal power. With reference to FIG. 6, the spectrum analyzer 602 can be coupled to the output of the I/Q modulator 610. The transmission circuitry can include an IFFT block 604 that generates information. The information can be pre-conditioned by a pre-compensation block 606, passed through a DAC 608, and modulated at the I/Q modulator 610. The resulting transmission signal at the output of the I/Q modulator 610 can be described by the complex function $$I_{tx} + j \cdot Q_{tx} = \frac{A}{2}\left[e^{j\omega_c t} + \left\{\frac{(\alpha_{tx} - \alpha_{est})}{2} - j \cdot \frac{(\beta_{tx} - \beta_{est})}{2}\right\}e^{-j\omega_c t}\right],$$

which, in general, has signal power $$P = \frac{A^2}{4}[(\alpha_{tx} - \alpha_{est})^2 + (\beta_{tx} - \beta_{est})^2].$$

In one embodiment, the value of $\alpha_\alpha$ can be determined based on three power measurements.

First: $\alpha_{est}$ and $\beta_{est}$ are set to zero and a signal power $P_1$ is measured by the spectrum analyzer;

Second: $\alpha_{est}$ is set to a known value $\Delta$, $\beta_{est}$ remains at zero, and a signal power $P_2$ is measured; and Third: $\alpha_{est}$ is set to $2\Delta$, $\beta_{est}$ remains at zero, and a signal power $P_3$ is measured.

Then, using $P_1$, $P_2$, $P_3$, and $\Delta$, $\alpha_\alpha$ can be computed as:

$$\alpha_{tx} = \frac{\Delta}{2}\left[\frac{4P_2 - 3P_1 - P_3}{2P_2 - P_1 - P_3}\right]. \quad \text{(EQ12)}$$

Exemplary values of $\Delta$ include values that are roughly $\alpha_{tx}/2$, $\alpha_{tx}/4$, $\alpha_{tx}/8$, and so on. A rough value of $\alpha_{tx}$ can generally be approximated based on knowing the parameters of the analog technology that is used.

The value of $\beta_\alpha$ can be determined using measurement $P_1$ above and two other measurements.

Fourth: $\beta_{est}$ is set to a known value $\Delta$, $\alpha_{est}$ is set to zero, and a signal power $P_4$ is measured; and Fifth: $\beta_{est}$ is set to a known value $2\Delta$, $\alpha_{est}$ remains at zero, and a signal power $P_s$ is measured.

Then, using $P_1$, $P_4$, $P_5$, and $\Delta$, $\beta_\alpha$ can be computed as:

$$\beta_{tx} = \frac{\Delta}{2}\left[\frac{4P_4 - 3P_1 - P_5}{2P_4 - P_1 - P_5}\right]. \quad \text{(EQ13)}$$

In the illustrated embodiment of FIG. 6, the computed values of the modulator's I/Q mismatch can be stored in the pre-compensation block 606 as $\alpha_{tx\_est}=\alpha_{tx}$ and $\beta_{tx\_est}=\beta_{tx}$ and can be used for the pre-compensation operation described above herein.

Figure 7:
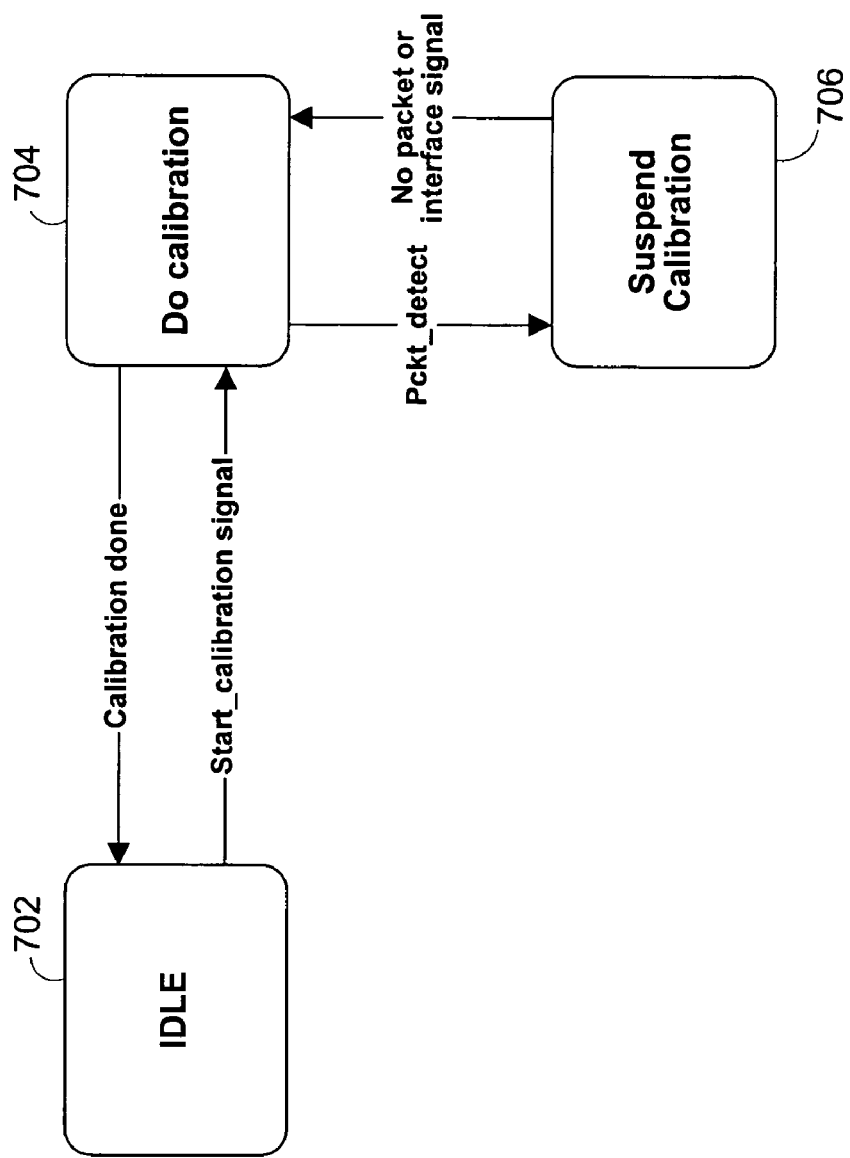
FIG. 7 is a state diagram of exemplary operating modes for a calibration circuit and exemplary transitions between operating modes.

FIG. 7 shows a state diagram of the modes of operation for a calibration block that estimates receiver mismatch values. The modes include an idle mode 702 in which the calibration operation is not being performed, a calibration mode 704 in which the calibration operation is being performed, and a suspend calibration mode 706 in which calibration is temporarily suspended and can be later resumed. From the idle mode 702, various conditions and/or events can trigger the start calibration signal and cause the calibration circuit to enter calibration mode 704. For example, such events can include the expiration of a periodic calibration timer or the receipt of a software instruction to perform calibration. Additionally, an example of a triggering condition can include a change in temperature in the communication system or communication circuitry beyond a particular threshold.

While performing the calibration operation, the calibration circuit can monitor incoming signals to determine whether any signals other than white, Gaussian noise samples are being received. For example, the receiver can include an automatic gain control ("AGC") circuit and an energy detection circuit that monitors the noise floor. When a signal stronger than the noise floor is received, such as a data signal or an interference signal, the AGC circuit can signal this event. Additionally, the energy detection circuit can also provide a notification when an incoming signal other than noise is received. If it is determined that an interference signal or a data signal is received, the calibration block can suspend calibration 706 until the interference or data signal has ended. Then, the calibration block can resume calibration 704. When the calibration operation is completed, the calibration block can return to idle mode 702.

The illustrated embodiments of FIGS. 1-7 are exemplary are do no limit the scope of the invention. The equations described herein as being implemented by various blocks in the disclosed communication system can be computed by hardware circuits and/or by software instructions running on a processor. The equation computations need not be performed with the exact terms and operations in the equations. For example, the equation computations can be performed using other terms and operations not shown in the equations to approximate the result of computing the equations. Thus, the various blocks in the communication system can perform computations based on the equations without directly computing the equations.

Additionally, the equations are exemplary and do not limit the scope of the invention. Although I/Q mismatch between "I" and "Q" oscillators are based on an amplitude mismatch $\alpha$ and a phase mismatch $\beta$, the oscillator signals can be described by equations other than equations EQ1 and EQ2. The receiver calibration samples need not be noise samples. The receiver calibration samples can be generated by a sample generator, and the samples need not be white, Gaussian samples. In general, the sequences of receiver calibration samples can include particular properties other than zero cross-correlation and zero power level difference. The detector/demodulator can disturb the particular properties by injecting I/Q mismatch into the detected samples. The compensation and pre-compensation blocks can operate to mitigate the effects of I/Q mismatch in the detected samples using estimates of the I/Q mismatch values provided by the calibration block. The calibration block can operate to iteratively adjust the estimates of the I/Q mismatch values based on examining whether the output values of the compensation block have the particular properties. When the output values of the compensation block do not have the particular properties, the calibration block can adjust the estimates of the I/Q mismatch values based on the output values. Therefore, the calibration block can operate based on equations other than EQ10 and EQ11.

Referring now to FIGS. 8A-8E, various exemplary implementations of the present invention are shown.

Figure 8A:
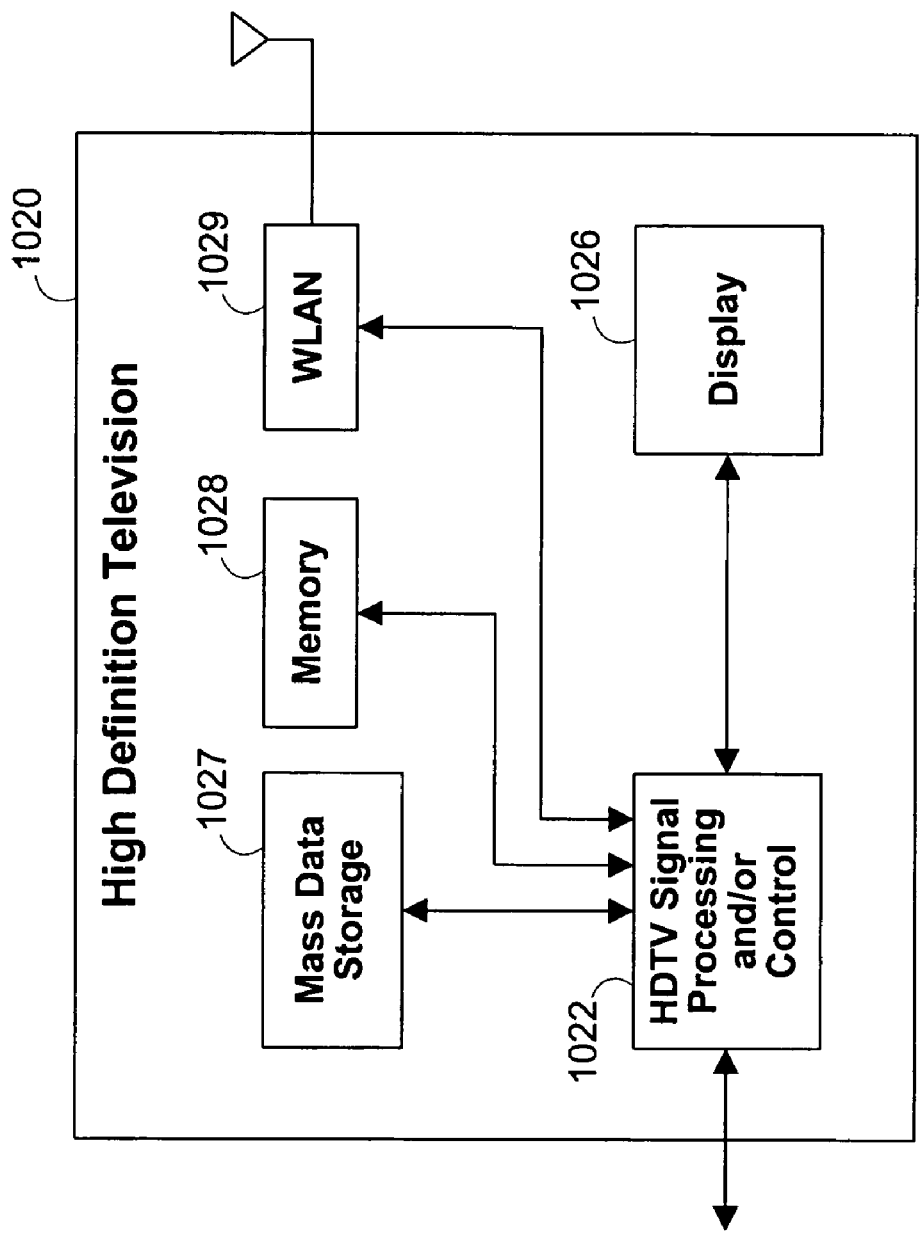
FIG. 8A is a block diagram of an exemplary high definition television that can employ the disclosed technology.

Referring now to FIG. 8A, the present invention can be implemented in a high definition television (HDTV) 1020. The present invention may implement either or both signal processing and/or control circuits, which are generally identified in FIG. 100C at 1022, a WLAN interface and/or mass data storage of the HDTV 1020. The HDTV 1020 receives HDTV input signals in either a wired or wireless format and generates HDTV output signals for a display 1026. In some implementations, signal processing circuit and/or control circuit 1022 and/or other circuits (not shown) of the HDTV 1020 may process data, perform coding and/or encryption, perform calculations, format data and/or perform any other type of HDTV processing that may be required.

The HDTV 1020 may communicate with mass data storage 1027 that stores data in a nonvolatile manner such as optical and/or magnetic storage devices. The HDD may be a mini HDD that includes one or more platters having a diameter that is smaller than approximately 1.8". The HDTV 1020 may be connected to memory 1028 such as RAM, ROM, low latency nonvolatile memory such as flash memory and/or other suitable electronic data storage. The HDTV 1020 also may support connections with a WLAN via a WLAN network interface 1029.

Figure 8B:
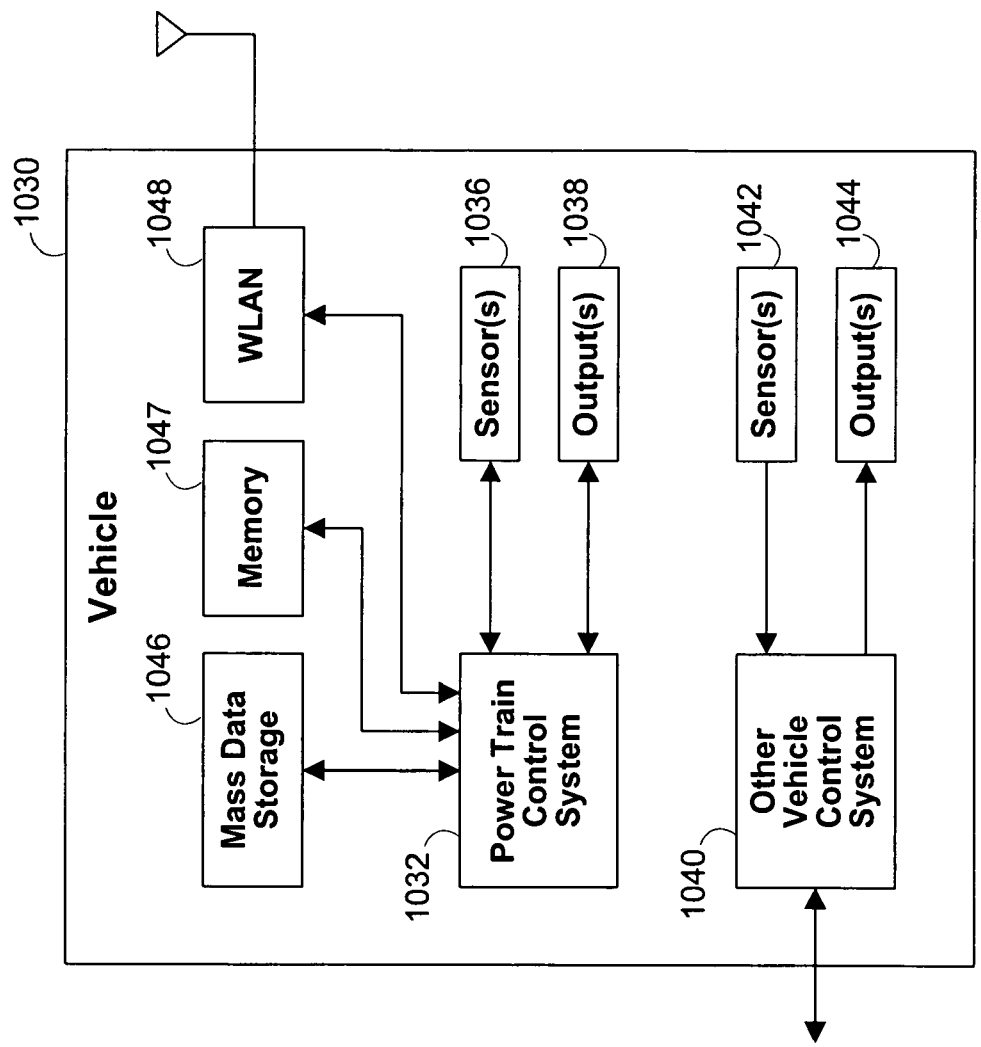
FIG. 8B is a block diagram of an exemplary vehicle that can employ the disclosed technology.

Referring now to FIG. 8B, the present invention implements a control system of a vehicle 1030, a WLAN interface and/or mass data storage of the vehicle control system. In some implementations, the present invention may implement a powertrain control system 1032 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 1040 of the vehicle 1030. The control system 1040 may likewise receive signals from input sensors 1042 and/or output control signals to one or more output devices 1044. In some implementations, the control system 1040 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1032 may communicate with mass data storage 1046 that stores data in a nonvolatile manner. The mass data storage 1046 may include optical and/or magnetic storage devices for example hard disk drives HDD and/or DVDs. The HDD may be a mini HDD that includes one or more platters having a diameter that is smaller than approximately 1.8". The powertrain control system 1032 may be connected to memory 1047 such as RAM, ROM, low latency nonvolatile memory such as flash memory and/or other suitable electronic data storage. The powertrain control system 1032 also may support connections with a WLAN via a WLAN network interface 1048. The control system 1040 may also include mass data storage, memory and/or a WLAN interface (all not shown).

Figure 8C:
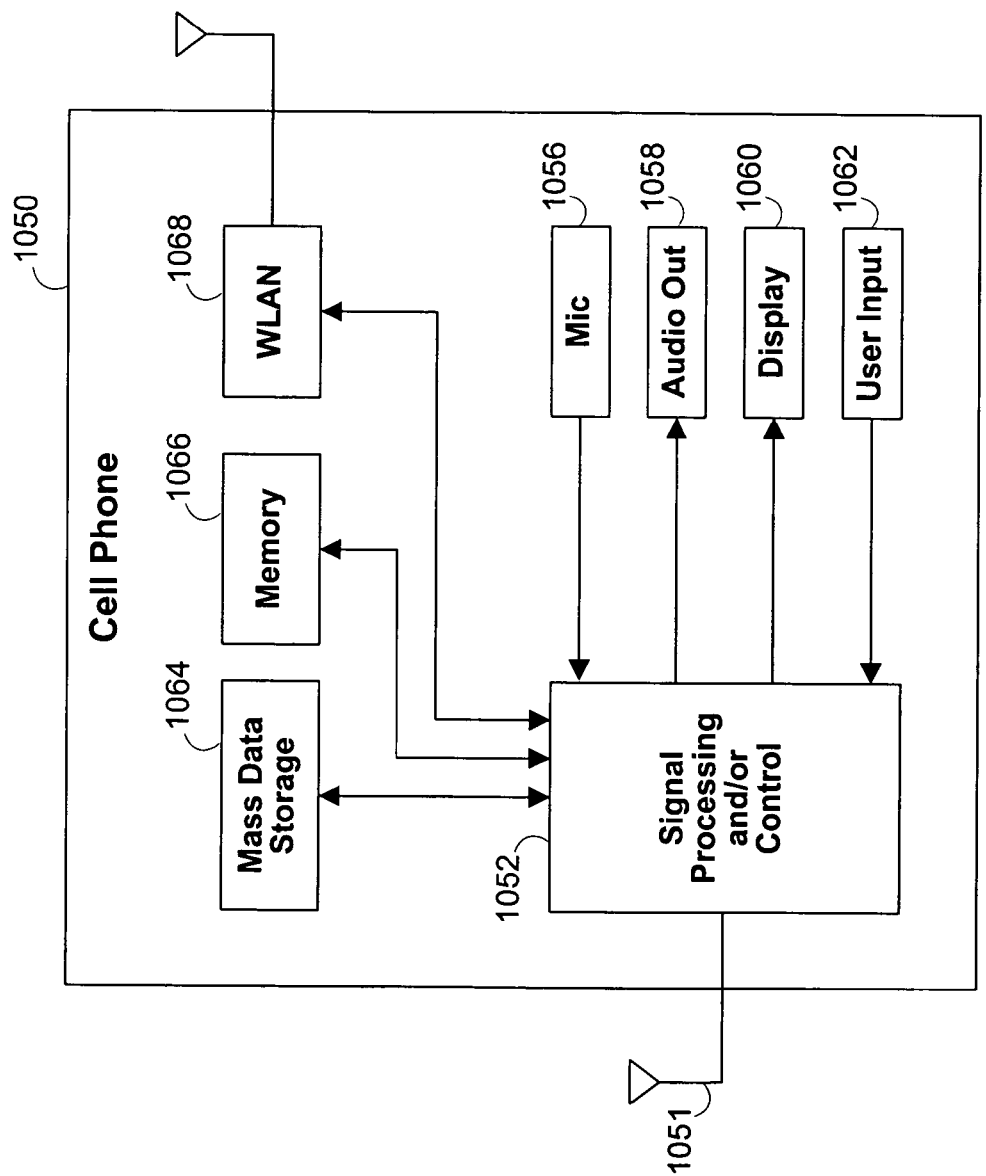
FIG. 8C is a block diagram of an exemplary cell phone that can employ the disclosed technology.

Referring now to FIG. 8C, the present invention can be implemented in a cellular phone 1050 that may include a cellular antenna 1051. The present invention may implement either or both signal processing and/or control circuits, which are generally identified in FIG. 100E at 1052, a WLAN interface and/or mass data storage of the cellular phone 1050. In some implementations, the cellular phone 1050 includes a microphone 1056, an audio output 1058 such as a speaker and/or audio output jack, a display 1060 and/or an input device 1062 such as a keypad, pointing device, voice actuation and/or other input device. The signal processing and/or control circuits 1052 and/or other circuits (not shown) in the cellular phone 1050 may process data, perform coding and/or encryption, perform calculations, format data and/or perform other cellular phone functions.

The cellular phone 1050 may communicate with mass data storage 1064 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 1050 may be connected to memory 1066 such as RAM, ROM, low latency nonvolatile memory such as flash memory and/or other suitable electronic data storage. The cellular phone 1050 also may support connections with a WLAN via a WLAN network interface 1068.

Figure 8D:
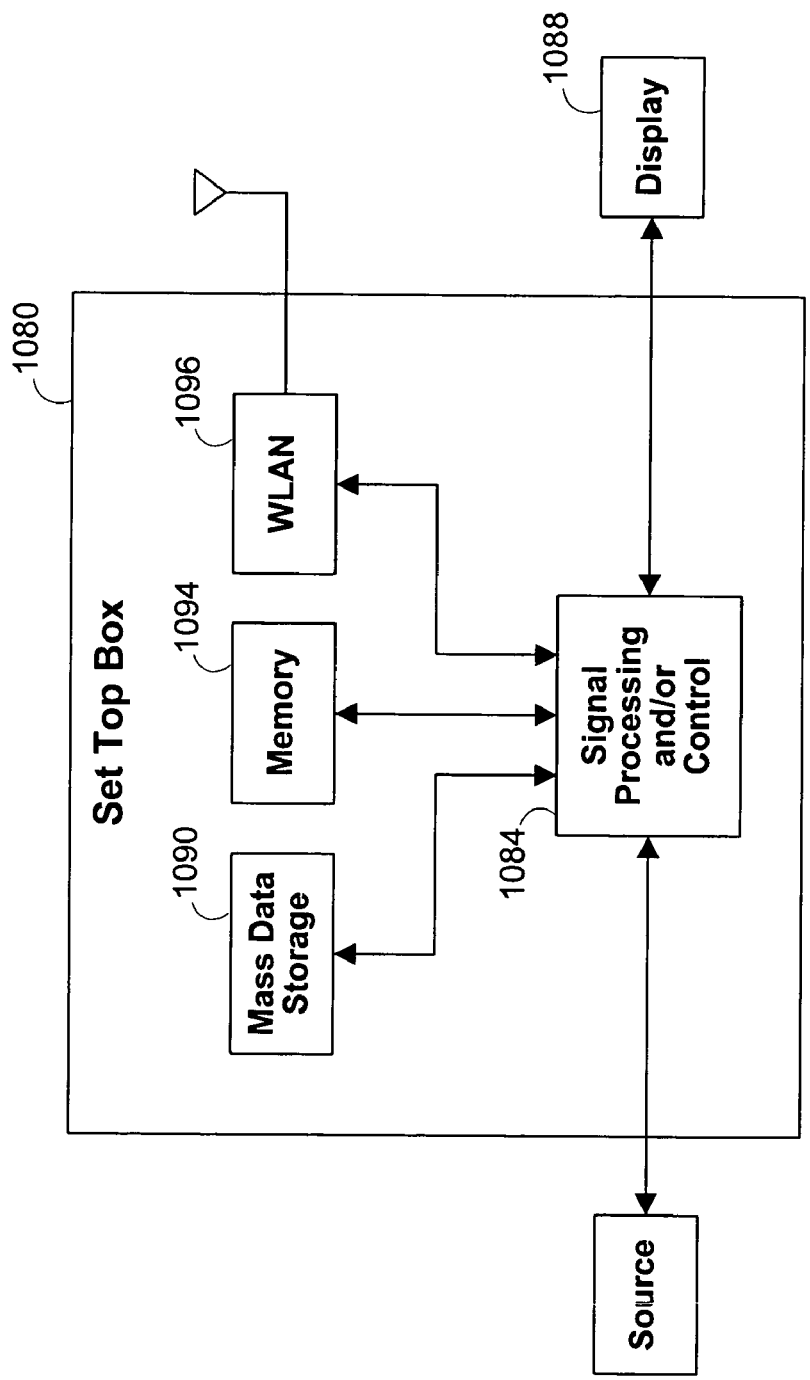
FIG. 8D is a block diagram of an exemplary set top box that can employ the disclosed technology.

Referring now to FIG. 8D, the present invention can be implemented in a set top box 1080. The present invention may implement either or both signal processing and/or control circuits, which are generally identified in FIG. 100F at 1084, a WLAN interface and/or mass data storage of the set top box 1080. The set top box 1080 receives signals from a source such as a broadband source and outputs standard and/or high definition audio/video signals suitable for a display 1088 such as a television and/or monitor and/or other video and/or audio output devices. The signal processing and/or control circuits 1084 and/or other circuits (not shown) of the set top box 1080 may process data, perform coding and/or encryption, perform calculations, format data and/or perform any other set top box function.

The set top box 1080 may communicate with mass data storage 1090 that stores data in a nonvolatile manner. The mass data storage 1090 may include optical and/or magnetic storage devices for example hard disk drives HDD and/or DVDs. The HDD may be a mini HDD that includes one or more platters having a diameter that is smaller than approximately 1.8". The set top box 1080 may be connected to memory 1094 such as RAM, ROM, low latency nonvolatile memory such as flash memory and/or other suitable electronic data storage. The set top box 1080 also may support connections with a WLAN via a WLAN network interface 1096.

Figure 8E:
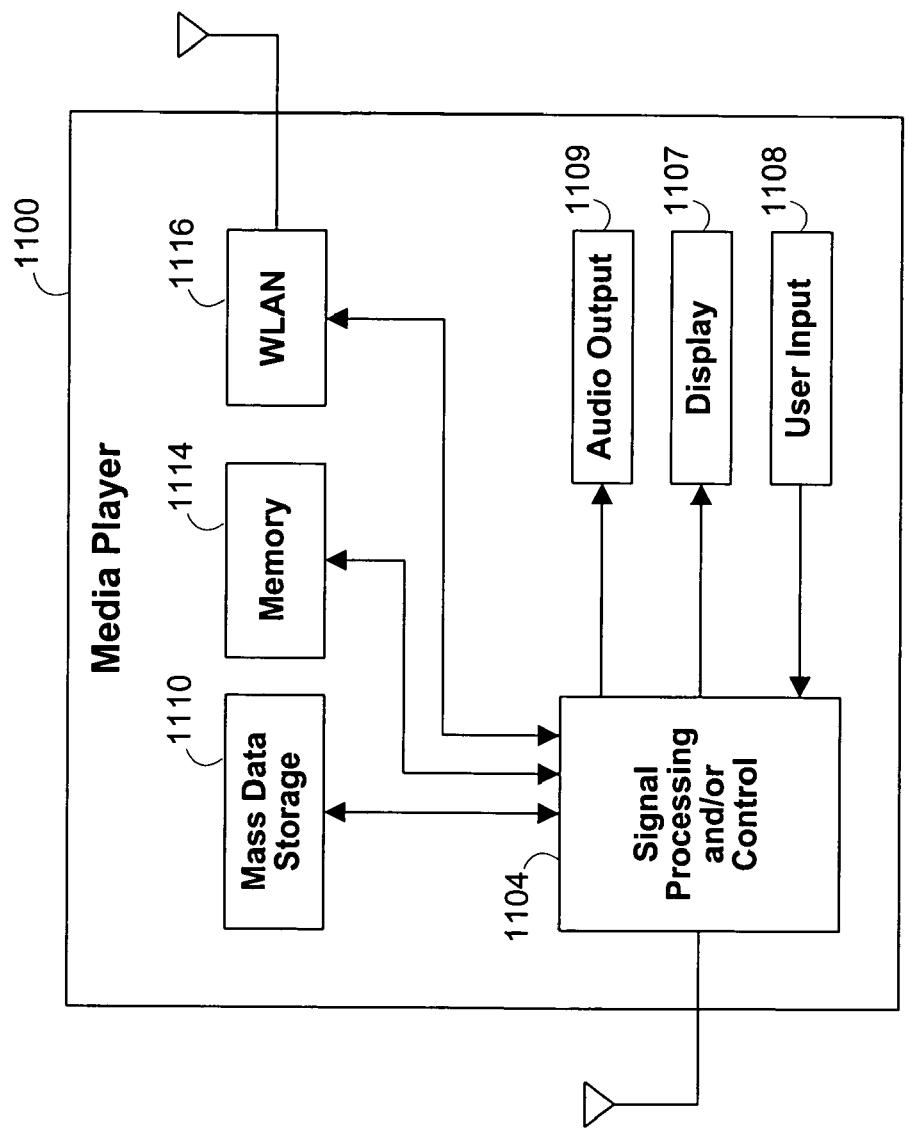
FIG. 8E is a block diagram of an exemplary media player that can employ the disclosed technology.

Referring now to FIG. 8E, the present invention can be implemented in a media player 1100. The present invention may implement either or both signal processing and/or control circuits, which are generally identified in FIG. 100G at 1104, a WLAN interface and/or mass data storage of the media player 1100. In some implementations, the media player 1100 includes a display 1107 and/or a user input 1108 such as a keypad, touchpad and the like. In some implementations, the media player 1100 may employ a graphical user interface (GUI) that typically employs menus, drop down menus, icons and/or a point-and-click interface via the display 1107 and/or user input 1108. The media player 1100 further includes an audio output 1109 such as a speaker and/or audio output jack. The signal processing and/or control circuits 1104 and/or other circuits (not shown) of the media player 1100 may process data, perform coding and/or encryption, perform calculations, format data and/or perform any other media player function.

The media player 1100 may communicate with mass data storage 1110 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 1100 may be connected to memory 1114 such as RAM, ROM, low latency nonvolatile memory such as flash memory and/or other suitable electronic data storage. The media player 1100 also may support connections with a WLAN via a WLAN network interface 1116. Still other implementations in addition to those described above are contemplated.

Accordingly, what have been described thus far are a method and apparatus for handling I/Q mismatch in a communication system that uses I/Q modulation. The disclosed methods, components, and circuits can be implemented using various analog and/or digital circuit means, including circuitry made from various types, sizes, and/or configurations of transistors, MOS transistors, field effect transistors, BJTs, diodes, resistors, capacitors, inductors, integrated circuits, operation amplifiers, operational transconductance amplifiers, comparators, registers, latches, and/or current sources. The disclosed methods and systems can also be implemented using a processor architecture having machine readable instructions. The disclosed embodiments and illustrations are exemplary and do not limit the scope of the disclosed invention as defined by the following claims.

What is claimed is:

1. A communication system, comprising:
a detector comprising an "I" oscillator and a "Q" oscillator that have the same frequency and that have at least one of an amplitude mismatch and a phase mismatch, wherein the detector provides a sequence of "I" samples and a sequence of "Q" samples based on the at least one of the amplitude mismatch and the phase mismatch;
a compensation circuit that is responsive to the detector and to a calibration circuit, wherein the compensation circuit provides a sequence of compensated "I" samples based on the sequence of "I" samples and provides a sequence of a compensated "Q" samples based on the sequence of "Q" samples,
wherein the calibration circuit provides at least one of an estimated amplitude mismatch and an estimated phase mismatch based on at least one of: a cross-correlation between the sequence of compensated "I" samples and the sequence of compensated "Q" samples, and a power level difference between the sequence of compensated "I" samples and the sequence of compensated "Q" samples,
wherein the compensation circuit provides at least one of the sequence of compensated "I" samples and the sequence of compensated "Q" samples based on at least one of the estimated amplitude mismatch and the estimated phase mismatch,
wherein the calibration circuit provides the at least one of the estimated amplitude mismatch and the estimated phase mismatch iteratively, and
wherein the calibration circuit provides the estimated amplitude mismatch based on:

$$\left(\frac{\alpha}{2}\right)_{est}[n] = \left(\frac{\alpha}{2}\right)_{est}[n-1] + (|I_{comp}| - |Q_{comp}|) \cdot 2^{StepI},$$

wherein:
n indicates a current iteration,
n−1 indicates a prior iteration, $$\left(\frac{\alpha}{2}\right)_{est}[n]$$

is the estimated amplitude mismatch for the current iteration, $$\left(\frac{\alpha}{2}\right)_{est}[n-1]$$

is the estimated amplitude mismatch for the prior iteration,
$I_{comp}$ is a compensated "I" sample,
$Q_{comp}$ is a compensated "Q" sample, and
StepI is an adjustable value.

2. The communication system of claim 1, further comprising:
a sequence of "I" white, Gaussian noise samples; and
a sequence of "Q" white, Gaussian noise samples,
wherein the detector provides the sequence of "I" samples based on the sequence of "I" white, Gaussian noise samples and provides the sequence of "Q" samples based on the sequence of "Q" white, Gaussian noise samples.

3. The communication system of claim 1, wherein the compensation circuit provides the sequence of compensated "I" samples based on:

$$I_{comp} = I_{mis}\left[1 - \left(\frac{\alpha}{2}\right)_{est}\right] + Q_{mis} \cdot \left(\frac{\beta}{2}\right)_{est},$$

wherein:
$I_{comp}$ is a compensated "I" sample,
$I_{mis}$ is an "I" sample,
$Q_{mis}$ is a "Q" sample, $$\left(\frac{\alpha}{2}\right)_{est}$$

is the estimated amplitude mismatch, and $$\left(\frac{\beta}{2}\right)_{est}$$

is the estimated phase mismatch.

4. The communication system of claim 1, wherein the compensation circuit provides the sequence of compensated "Q" samples based on:

$$Q_{comp} = I_{mis} \cdot \left(\frac{\beta}{2}\right)_{est} + Q_{mis}\left[1 + \left(\frac{\alpha}{2}\right)_{est}\right],$$

wherein:
$Q_{comp}$ is a compensated "Q" sample,
$I_{mis}$ is an "I" sample,
$Q_{mis}$ is a "Q" sample, $$\left(\frac{\alpha}{2}\right)_{est}$$

is the estimated amplitude mismatch, and $$\left(\frac{\beta}{2}\right)_{est}$$

is the estimated phase mismatch.

5. The communication system of claim 1, wherein the at least one of the estimated amplitude mismatch and the estimated phase mismatch converges to a particular value when the cross-correlation between the sequence of compensated "I" samples and the sequence of compensated "Q" samples converges to zero.

6. The communication system of claim 1, wherein the at least one of the estimated amplitude mismatch and the estimated phase mismatch converges to a particular value when the cross-correlation between the sequence of compensated "I" samples and the sequence of compensated "Q" samples converges to zero.

7. The communication system of claim 1, further comprising a gear shifting circuit for adjusting StepI.

8. The communication system of claim 1, wherein the calibration circuit provides the estimated phase mismatch based on:

$$\left(\frac{\beta}{2}\right)_{est}[n] = \left(\frac{\beta}{2}\right)_{est}[n-1] + (I_{comp} \cdot Q_{comp}) \cdot 2^{StepQ}$$

wherein,
  n indicates a current iteration,
  n−1 indicates a prior iteration, $$\left(\frac{\beta}{2}\right)_{est}[n]$$

is the estimated phase mismatch for the current iteration, $$\left(\frac{\beta}{2}\right)_{est}[n-1]$$

is the estimated phase mismatch for the prior iteration,
  $I_{comp}$ is a compensated "I" sample,
  $Q_{comp}$ is a compensated "Q" sample, and
  StepQ is an adjustable value.

9. The communication system of claim 8, further comprising a gear shifting circuit for adjusting the StepQ.

10. The communication system of claim 1, wherein the calibration circuit includes an idle mode, a calibration mode, and a suspend calibration mode.

11. The communication system of claim 1, further comprising:
  an input connection that receives information to be transmitted;
  a pre-compensation circuit that pre-conditions the information to provide pre-compensated information; and
  an IQ-modulator having a second "I" oscillator and a second "Q" oscillator for providing a modulated signal based on the pre-compensated information, wherein the second "I" oscillator and the second "Q" oscillator have a same frequency and have at least one of: a second amplitude mismatch and a second phase mismatch.

12. The communication system of claim 11, further comprising a loop back connection connected to the IQ-modulator and the detector.

13. The communication system of claim 11, wherein the detector receives the modulated signal.

14. The communication system of claim 11, wherein the pre-compensation circuit provides the pre-compensated information based on the information and at least one of the estimated amplitude mismatch and the estimated phase mismatch.

15. The wireless communication system comprising the communication system of claim 1, wherein the wireless communication system is compliant with at least one of: IEEE 802.11, IEEE 802.11a, IEEE 802.11b, IEEE 802.11g, and IEEE 802.11n.

16. A method of estimating at least one of an amplitude mismatch and a phase mismatch between an "I" oscillator and a "Q" oscillator, the method comprising:
  receiving information to be transmitted;
  providing a first IQ-modulated signal based on the information;
  providing a first power measurement of the first IQ-modulated signal;
  providing an estimated amplitude mismatch based on the first power measurement;
  providing an estimated phase mismatch based on the first power measurement;
  pre-compensating the information using a first amplitude mismatch pre-compensation level to provide a first pre-compensated information;
  providing a second IQ-modulated signal based on the first pre-compensated information;
  providing a second power measurement of the second IQ-modulated signal;
  pre-compensating the information using a second amplitude mismatch pre-compensation level to provide a second pre-compensated information;
  providing a third IQ-modulated signal based on the second pre-compensated information; and
  providing a third power measurement of the third IQ-modulated signal.

17. The method of claim 16, wherein the second amplitude mismatch pre-compensation level is two times the first amplitude mismatch pre-compensation level.

18. The method of claim 17, wherein providing an estimated amplitude mismatch includes providing an estimated amplitude mismatch based on:

$$\alpha_{tx\_est} = \frac{\Delta}{2}\left[\frac{4P_2 - 3P_1 - P_3}{2P_2 - P_1 - P_3}\right],$$

wherein:
  $\alpha_{tx\_est}$ is the estimated amplitude mismatch,
  $\Delta$ is the first amplitude mismatch pre-compensation level;
  $P_1$ is the first power measurement,
  $P_2$ is the second power measurement, and
  $P_3$ is the third power measurement.

19. A method of estimating at least one of an amplitude mismatch and a phase mismatch between an "I" oscillator and a "Q" oscillator, the method comprising:
  receiving information to be transmitted;
  providing a first IQ-modulated signal based on the information;
  providing a first power measurement of the first IQ-modulated signal;
  providing an estimated amplitude mismatch based on the first power measurement;
  providing an estimated phase mismatch based on the first power measurement;
  pre-compensating the information using a first phase mismatch pre-compensation level to provide a first pre-compensated information;
  providing a second IQ-modulated signal based on the first pre-compensated information;
  providing a second power measurement of the second IQ-modulated signal;
  pre-compensating the information using a second phase mismatch pre-compensation level to provide a second pre-compensated information;
  providing a third IQ-modulated signal based on the second pre-compensated information; and
  providing a third power measurement of the third IQ-modulated signal.

20. The method of claim 19, wherein the second phase mismatch pre-compensation level is two times the first phase mismatch pre-compensation level.

21. The method of claim 20, wherein providing an estimated phase mismatch includes providing an estimated phase mismatch based on:

$$\beta_{tx\_est} = \frac{\Delta}{2}\left[\frac{4P_4 - 3P_1 - P_5}{2P_4 - P_1 - P_5}\right],$$

wherein:
- $\beta_{tx\_est}$ is the estimated phase mismatch,
- $\Delta$ is the first phase mismatch pre-compensation level;
- $P_1$ is the first power measurement,
- $P_4$ is the second power measurement, and
- $P_5$ is the third power measurement.

* * * * *